(12) United States Patent
Schrooten et al.

(10) Patent No.: US 8,846,261 B2
(45) Date of Patent: Sep. 30, 2014

(54) SYSTEM FOR CONTROLLING TEMPERATURE IN A FUEL CELL

(75) Inventors: Jeremy Schrooten, Mission (CA);
Jean-Louis Iaconis, Burnaby (CA);
Paul Sobejko, North Vancouver (CA);
Benjamin Tam, Vancouver (CA);
Gerard F McLean, West Vancouver (CA)

(73) Assignee: Societe BIC, Clichy (FR)

( * ) Notice: Subject to any disclaimer, the term of this patent is extended or adjusted under 35 U.S.C. 154(b) by 118 days.

(21) Appl. No.: 13/535,733

(22) Filed: Jun. 28, 2012

(65) Prior Publication Data

US 2014/0004436 A1 Jan. 2, 2014

(51) Int. Cl.
*H01M 8/04* (2006.01)

(52) U.S. Cl.
CPC .......... *H01M 8/04007* (2013.01); *Y02E 60/50* (2013.01)
USPC .......................................... 429/434; 429/436

(58) Field of Classification Search
CPC .............. H01M 8/04; H01M 8/04067; H01M 8/04074; H01M 8/04007
USPC .................................................. 429/434, 436
See application file for complete search history.

(56) References Cited

U.S. PATENT DOCUMENTS

| 7,625,649 B1 * | 12/2009 | Faghri et al. ................... 429/413 |
| 7,632,587 B2 * | 12/2009 | McLean et al. ................ 429/453 |
| 7,846,593 B2 * | 12/2010 | Fabian et al. .................. 429/414 |
| 7,943,263 B2 | 5/2011 | Brantley et al. |
| 2002/0150804 A1 * | 10/2002 | Srinivasan et al. .............. 429/32 |
| 2003/0159922 A1 | 8/2003 | Miley |
| 2005/0008911 A1 | 1/2005 | Kaye |
| 2006/0141308 A1 * | 6/2006 | Becerra et al. .................. 429/24 |
| 2006/0216561 A1 * | 9/2006 | Chien et al. ..................... 429/26 |
| 2007/0231646 A1 * | 10/2007 | Shu et al. ........................ 429/26 |
| 2007/0287043 A1 * | 12/2007 | Marsh et al. .................... 429/23 |
| 2008/0090107 A1 * | 4/2008 | Scartozzi et al. ................ 429/7 |
| 2010/0009231 A1 * | 1/2010 | Kim et al. ....................... 429/30 |

FOREIGN PATENT DOCUMENTS

| JP | 2007087701 A * | 4/2007 |
| JP | 2009283150 A * | 12/2009 |
| WO | WO-2014004605 A1 | 1/2014 |

OTHER PUBLICATIONS

International Application Serial No. PCTUS2013047764, International Search Report mailed Nov. 29, 2013, 2 pgs.
International Application Serial No. PCTUS2013047764, Written Opinion mailed Nov. 29, 2013, 6 pgs.

* cited by examiner

*Primary Examiner* — Gregg Cantelmo
(74) *Attorney, Agent, or Firm* — Schwegman Lundberg & Woessner, P.A.

(57) ABSTRACT

Methods, articles, and systems for controlling the internal operating temperature of fuel cell systems, such as planar fuel cell arrays. The heat management system conducts heat away from the fuel cell without disturbing the flow of gases around the fuel cell layer and without the need for the equipment to disturb the flow of gases around the fuel cell layer. The present invention also provides a heat transfer system that has a low thermal mass relative to the fuel cell layer or is thermally isolated from the fuel cell layer such that the heat transfer system will not remove substantial amounts of heat from a fuel cell layer during star-up and can be activated to dissipate heat from the fuel cell only as needed.

24 Claims, 3 Drawing Sheets

SYSTEM FOR CONTROLLING TEMPERATURE IN A FUEL CELL

FIELD OF THE INVENTION

The subject matter of the present invention relates to systems and methods for maintaining fuel cell performance over a wide range of environmental conditions.

BACKGROUND

Successive generations of portable electronic devices tend to trend smaller in size while provide increased performance. As electronic components are designed smaller in size and incorporate sophisticated and complex technology, the demands on the associated power supply usually increase. For instance, the power supply may need to occupy less volume or possess a smaller footprint so that the overall device can accommodate the additional technology or decrease in overall size. Further, the additional technology may require that the power supply last for longer periods of time or that power be delivered at uniform rates for steady electronic component performance.

One example of a power supply is a fuel cell system. A fuel cell system may include one or more fuel cell layers, each layer including one or more anodes and cathodes with an electrolyte membrane disposed between the anode(s) and cathode(s). A small, layered fuel cell system must be robust, while accommodating the reduced space requirements.

Maintaining consistent performance of a planar fuel cell across a wide range of operating conditions presents a difficult technical challenge, particularly for systems used in small handheld electronics where space constraints limit the size of the system.

A need exists for small layered fuel cell systems that are robust.

SUMMARY

The present invention relates to methods, articles, and systems for controlling the internal operating temperature of fuel cell systems.

In some embodiments, the present invention includes a method of controlling the operating temperature of a fuel cell system. The method includes providing a fuel cell system that includes a planar fuel cell array, a heat transport means in direct thermal communication with the planar fuel cell array, a heat dissipation device in direct thermal communication with the heat transport means and indirect thermal communication with the planar fuel cell array, and a heat removal device in indirect thermal communication with the planar fuel cell array and the heat transport means and configured to remove heat from the heat dissipation device. The method also includes contacting the planar fuel cell array with a fuel to produce heat and electricity until the planar fuel cell array reaches a desired operating temperature, wherein the heat removal device is not activated while the planar fuel cell array is below the desired operating temperature. The heat is removed from the heat dissipation device by activating the heat removal device if the planar fuel cell array exceeds the desired operating temperature.

In further embodiments, the invention includes fuel cell systems that comprise a planar fuel cell having an anode side, a cathode side, and a lateral edge; a heat transport means in direct thermal communication with the lateral edge of the planar fuel cell, wherein the heat transport means does not contact either the anode side or the cathode side of the planar fuel cell; a heat dissipation device in direct thermal communication with the heat transport means; and a heat removal means configured to remove heat from the heat dissipation device.

The present invention provides fuel cell systems that produce a more constant power output over a wide range of operating temperatures by maintaining a consistent internal fuel cell operating temperature. By keeping the thermal mass of the fuel cell and heat transport components relatively low, it can be ensured that the fuel cell will always overheat and that the internal temperature of the fuel cell can be managed with a "cooling only" strategy that is more compact, cheaper, and easier to install than the heating/cooling systems required by more thermally massive systems.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

Figure 1:
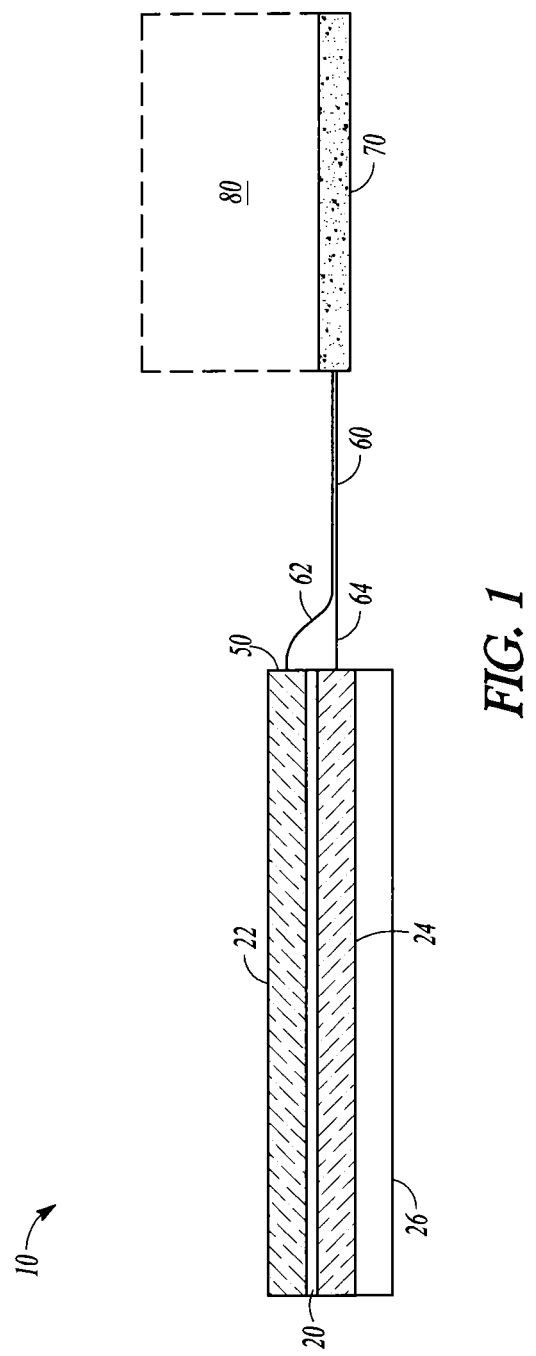
FIG. 1 illustrates a schematic view of a portion of a fuel cell system of the invention.

Throughout the following description, specific details are set forth in order to provide a more thorough understanding of the invention. However, the invention may be practiced without these particulars. In other instances, well known elements have not been shown or described in detail in order to avoid unnecessarily obscuring the invention. The drawings show, by way of illustration, specific embodiments in which the invention may be practiced. These embodiments may be combined, other elements may be utilized or structural or logical changes may be made without departing from the scope of the invention. Accordingly, the specification and drawings are to be regarded in an illustrative, rather than a restrictive, sense.

All publications, patents and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used to include one or more than one, independent of any other instances or usages of "at least one" or "one or more". In this document, the term "or" is used to refer to a nonexclusive or, such that "A, B or C" includes "A only", "B only", "C only", "A and B", "B and C", "A and C", and "A, B and C", unless otherwise indicated. In the appended aspects or claims, the terms "first", "second" and "third", etc. are used merely as labels, and are not intended to impose numerical requirements on their objects. It shall be understood that any numerical ranges explicitly disclosed in this document shall include any subset of the explicitly disclosed range as if such subset ranges were also explicitly disclosed; for example, a disclosed range of 1-100 shall also include the ranges 1-80, 2-76, or any other numerical range that falls between 1 and 100. In another example, a disclosed range of "1,000 or less" shall also include any range that is less than 1,000, such as 50-100, 25-29, or 200-1,000.

When structures are described herein as being in "direct thermal communication," it is meant that the structures are in physical contact such that heat may flow between the structures by direct conduction from the first structure to the second structure without the heat having to conduct or flow through any intermediate third structure. For example, if a heat dissipation device is described as being in direct thermal communication with a heat transport device, it means that the heat dissipation device is in physical contact with the heat transport device and that heat can flow between the heat dissipation and transport devices via conduction.

When structures are described herein as being in "indirect thermal communication," it is meant that the structures are not in physical contact and that any heat from a first structure to a second structure must first be conducted through at least one intermediate structure. For example, if a heat dissipation device is described as being in indirect thermal communication with a planar fuel cell layer, it means that the heat dissipation device is not in physical contact with the fuel cell layer but that heat can flow between the heat dissipation device and the fuel cell layer (e.g., by heat flowing through an intermediate heat transport device that is in direct thermal communication with both the fuel cell layer and the heat dissipation device).

As used herein, "fuel cell" may refer to a single fuel cell, or a collection of fuel cells. The fuel cells may be arranged and connected together, so as to form an array of fuel cells. Arrays of unit cells may be constructed to provide varied power generating fuel cell layers in which the entire electrochemical structure is contained within the layer. Arrays can be formed to any suitable geometry. For example, an array of unit fuel cells may be arranged adjacently to form a planar fuel cell layer. A planar fuel cell layer may be planar in whole or in part, and may also be flexible in whole or in part. Fuel cells in an array can also follow other planar surfaces, such as tubes or curves. Alternately or in addition, the array can include flexible materials that can be conformed to other geometries.

The present invention relates to methods, articles, and systems for controlling the internal operating temperature of fuel cell systems, such as the fuel cells and systems described by McLean, et al. in their U.S. Pat. No. 7,632,587 entitled "Electrochemical Cells Having Current-Carrying Layers Underlying Catalyst Layers" and in their U.S. Patent Application Publication 2010/0183955 entitled "Electrochemical Cells Having Current-Carrying Structures Underlying Electrochemical Reaction Layers" or described by Schrooten, et al. in their U.S. Patent Application Publication 2009/0081493 entitled "Fuel Cell Systems Including Space-Saving Fluid Plenum and Related Methods" and in their U.S. Patent Application Publication 2011/0003229 entitled "Electrochemical Cells and Membranes Related Thereto" or described by Schrooten, et to al. in their PCT Patent Application Publication WO 2011/079377 entitled "Fuel Cells and Fuel Cell Components Having Asymmetric Architecture and Methods Thereof" or described by McLean in his U.S. Pat. No. 7,205,057 entitled "Integrated Fuel Cell and Heat Sink Assembly" or described by McLean, et al. in their U.S. Patent Application Publication 2009/0297895 entitled "Systems and Methods for Managing Heat in Portable Electronic Devices." Each of these patent documents are incorporated herein by reference in their entirety. More specifically, the invention relates to an adaptive heat removal system that can be used to maintain stable operating temperatures by controlling the rate at which heat is removed from a planar fuel cell layer without disrupting the passive airflow around the fuel cell layer's cathode regions and minimizing the creation of temperature gradients within the fuel cell layer.

A fuel cell's internal operating temperature is a function of, inter alia, the heat generated by the fuel cell reaction, the temperature of the environment in which the fuel cell is operating, and the characteristics of any heat management system used with the fuel cell or assembly of fuel cells (e.g., a fuel cell layer). At start-up, the internal temperature of the fuel cell may be the same or similar to the temperature of the operating environment. As heat is released by an exothermic fuel cell reaction, the internal temperature of the fuel cell may rise and eventually exceed the temperature of the operating environment.

It has been surprisingly discovered that a fuel cell has an optimal operating temperature at which the cell will produce higher amounts of power and that deviations below or above this optimal temperature will reduce the power produced by the cell for different reasons. If, for example, the operating temperature falls below the optimal operating temperature, unfavorable temperature gradients within the cell or surrounding components may cause water vapor to condense within the fuel cell system. The condensed water may limit mass transport activity within the cell, leading to reduced power production or even complete flooding of the fuel cell. If, on the other hand, the cell's operating temperature rises above optimal, the cell may not be able to reject sufficient heat to the environment or the membrane may dry out, leading to increased membrane resistance and, ultimately, decreased power production from the fuel cell. For this reason, fuel cells often use pre-heater and heat dissipation devices. The preheater warms a fuel cell during start-up so that the fuel cell can reach a higher operating temperature. The heat dissipation devices (e.g., large heat sinks or cooling fans) are used to remove heat from the fuel cell so that it does not over heat.

However, it has been surprisingly discovered that heat dissipation devices, such as large heat sinks, may actually inhibit the performance of the system. For example, while a heat sink may work as desired when the fuel cell(s) is operating at a high temperature, at low temperatures the heat sink may dissipate too much heat and actually prolong system start-up or even prevent the fuel cell from ever reaching the optimal operating temperature. Other heat management systems removed heat from the fuel cell layer by modifying the airflow contacting the layer (e.g, a cooling fan that blows air onto the fuel cell layer). Modifying the airflow over the cathode surface can alter the water transport properties within the cathode. Similarly, modifying the flow of air over the anode surface can result in severe temperature gradients forming within the fuel cell layer, potentially causing water condensation and/or degrading fuel cell performance in certain conditions.

The present invention is founded upon the insight that favorable fuel cell performance can be obtained by limiting the thermal mass of the fuel cell system. By keeping the thermal mass of the fuel cell system small one can eliminate the need of various system components, such as components used to raise the operating temperature of the fuel cell. These goals can be accomplished by using a heat management system that does not i) prolong or prevent the fuel cell from reaching a desired operating temperature during start-up, ii) affect the flow of gas over the anode or cathode surfaces of the fuel cell, and iii) does not create large temperature gradients within the fuel cell layer.

The present invention provides a fuel cell heat management system that conducts heat away from the fuel cell without disturbing the flow of gases around the fuel cell layer and without the need for the equipment to disturb the flow of gases around the fuel cell layer. The present invention also provides a heat transfer system that has a low thermal mass relative to the fuel cell layer or is thermally isolated from the fuel cell layer such that the heat transfer system will not remove substantial amounts of heat from a fuel cell layer during star-up and can be activated to dissipate heat from the fuel cell only as needed. In some embodiments, the present invention provides a fuel cell system that will always overheat, even in cold environments. Hence, the present invention provides a fuel cell system that can work at low temperature without the need for separate heating.

FIG. 1 illustrates one embodiment of the invention that includes fuel cell system 10. Fuel cell system 10 includes fuel cell 20, heat transport means 60, heat dissipation device 70, and means for removing heat 80. In the illustrated embodiment, fuel cell 20 is a planar fuel cell, such as one of the planar fuel cells described in one or more of the above-mentioned incorporated patent documents. Fuel cell 20 may optionally include an array of unit fuel cells, such as a fuel cell layer. Fuel cell 20 includes air-breathing cathode surface 22, fuel-consuming anode surface 24, and fuel distribution manifold 26. The fuel may be hydrogen. In some embodiments, fuel cell 20 has a power to weight ratio of 1 Watt per gram or greater (e.g., 1.5 Watts per gram, 2 Watts per gram, or more than 2 Watts per gram).

Heat transport means 60 is a thermally conductive material or fluid-filled duct or pipes. In some embodiments, heat transport means 60 is a thin copper foil. In further embodiments, heat transport means 60 is a material having a thermal conductivity of at least 100 W/mK up to 2,000 W/mK.

Fuel cell 20 is attached to, and in thermal communication with, heat transport means 60 via conductive heat transfer elements 62 and 64. Heat transfer elements 62 and 64 of heat transport means 60 are both attached to, and in thermal communication with, lateral side 50 of fuel cell 20. Heat transfer element 62 is connected to the lateral side of air-breathing cathode surface 22 while heat transfer element 64 is connected to the lateral side of hydrogen-consuming anode surface 24. In some embodiments, heat transfer element 64 is connected to the lateral side of hydrogen distribution manifold 26. In yet further embodiments, heat transfer element 64 is connected to or spans both the lateral side of hydrogen distribution manifold 26 and the lateral side of hydrogen-consuming anode surface 24.

Heat transport means 60 is attached to, and in thermal communication with, heat dissipation device 70. Heat dissipation device 70 can be, for example, a heat sink. Heat dissipation device 70 is attached to, and in thermal communication with, means for removing heat 80. Means for removing heat can be, for example, a fan or a solid state heat transfer mechanism (e.g., a Peltier cooler). In some embodiments, heat dissipation device 70 and means for removing heat 80 are, together, a cooling system that uses a heat transfer fluid (e.g., a fluid other than air).

Heat transport means 60 and heat dissipation device 70 are designed such that their combined thermal mass is low relative to the thermal mass of fuel cell 20. In some embodiments of the invention, heat transport means 60 and heat dissipation device 70 may have a combined thermal mass that is less than 200% greater than the thermal mass of fuel cell 20.

In operation, an oxidant and fuel are directed into contact with fuel cell 20 and the fuel cell reaction begins, thereby causing fuel cell 20 to start generating power and heat. As the heat mass builds within fuel cell 20, the internal operating temperature of fuel cell 20 rises further driving the fuel cell reaction forward and increasing the amount of power and heat produced by fuel cell 20. Since the combined thermal masses of heat transport means 60 and heat dissipation device 70 are low relative to the thermal mass of fuel cell 20, much of the heat generated by the fuel cell reaction during this start-up phase stays within fuel cell 20. In this way, heat transport means 60 and heat dissipation device 70 do not prevent the operating temperature of fuel cell 20 from increasing.

The heat generated by the fuel cell reaction is removed from the lateral sides of fuel cell 20, conducted through heat transport means 60 and directed into heat dissipation device 70. If the internal operating temperature of fuel cell 20 exceeds a desired value, means for removing heat 80 is engaged to remove heat from system 10 until the internal operating temperature of fuel cell 20 is restored to the desired value. Since the heat management components of fuel cell system 10 only remove heat from the later sides of fuel cell 20, the flow of gas over cathode and anode surfaces 22, 24 is not disturbed.

In this manner, fuel cell 20 can start operating at relatively low temperature (e.g., a temperature below 0° C. or between about 0° C. and about 45° C.), reach a desired internal operating temperature (e.g., a temperature between about 45° C. and about 55° C.), and be kept at or near that desired internal operating temperature without disturbing the flow of oxidant or fuel to fuel cell 20, without the need for the use of a pre-heater, and without creating large temperature gradients within fuel cell 20.

Figure 2:
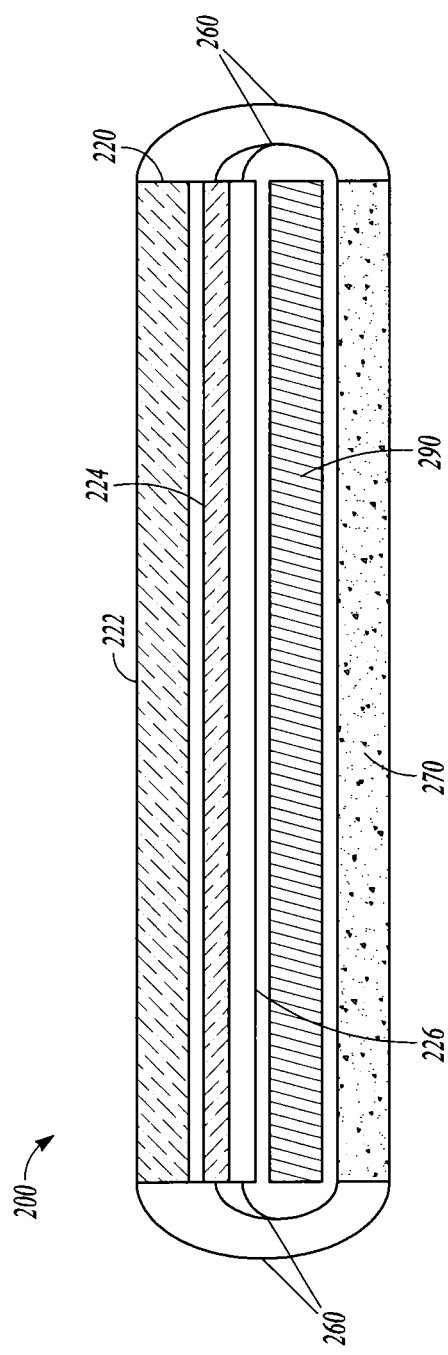
FIG. 2 illustrates a cross-sectional view of a portion of a fuel cell system of the invention.

In some embodiments of the invention, the heat dissipation device may be located near the rest of the fuel cell system. FIG. 2 illustrates such an embodiment of the invention as fuel cell system 200. Heat dissipation device 270 is located proximally to the rest of fuel cell system 200. System 200 includes fuel cell 220, heat transport means 260, and heat dissipation device 270. Fuel cell 220 may be a planar fuel cell, such as one of the planar fuel cells described in one or more of the above-mentioned incorporated patent documents. Fuel cell 220 includes air-breathing cathode surface 222, hydrogen-consuming anode surface 224, and hydrogen distribution manifold 226. System 200, in some embodiments of the invention, includes a means for removing heat (not illustrated) in thermal communication with heat dissipation device 270, similar to means for removing heat 80 of system 10 illustrated in FIG. 1.

Heat transport means 260 is connected to opposite lateral sides of fuel cell 220 and conducts heat from those lateral sides of cell 220 to the lateral sides of heat dissipation device 270. Insulating layer 290 is disposed between and on major planes of both planar fuel cell 220 and heat dissipation device 270. While heat dissipation device 270 is located directly behind hydrogen distribution manifold 226, heat dissipation device 270 is isolated from direct transfer of heat between fuel cell 1220 by insulating layer 290. In some embodiments, insulating layer 290 is less than 1 millimeter thick and/or has a thermal conductivity of 10 W/mK or less.

Figure 3:
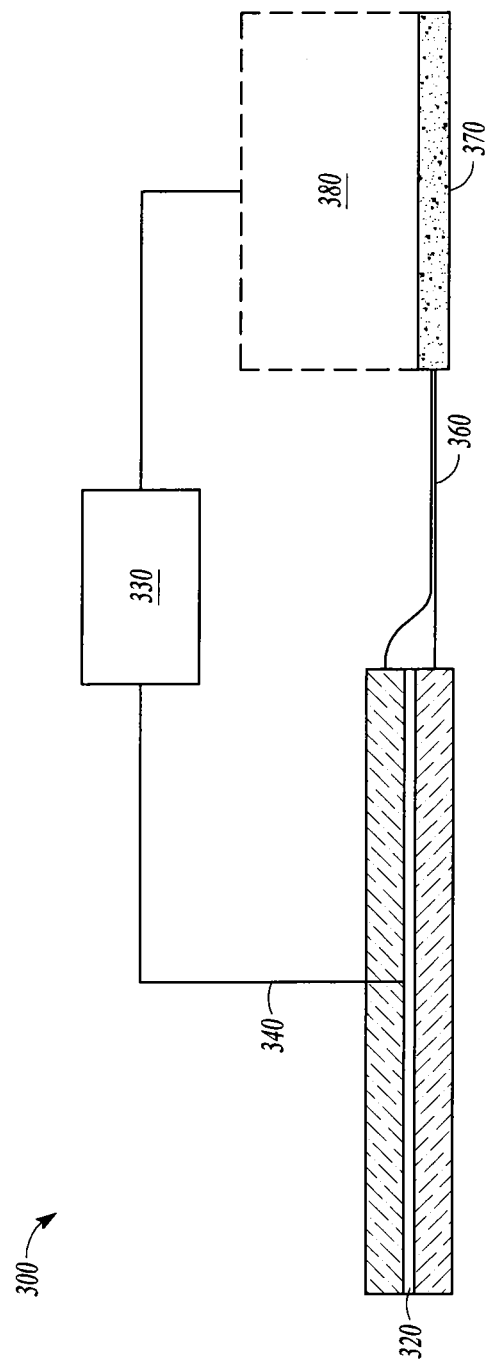
FIG. 3 illustrates a schematic view of a portion of a fuel cell system of the invention.

FIG. 3 illustrates another embodiment of the invention that includes fuel cell system 300. Fuel cell system 300 includes fuel cell 320 (which may be a planar fuel cell), heat transport means 360, heat dissipation device 370, and means for removing heat 380. As with the prior illustrated embodiments, heat transport means 360 is attached to and is in thermal communication with fuel cell 320 and heat dissipation device 370. Means for removing heat 380 is controlled by and in electrical communication with controller 330. Controller 330 monitors the internal operating temperature of fuel cell 320 via monitoring line 340. During operation, controller 330 activates means for removing heat 380 based upon the measured operating temperature of fuel cell 320. When the operating temperature of fuel cell 320 rises above an accepted limit, as measured by controller 330, means for removing heat 380 is activated until the operating temperature of cell 320 drops to a lower predetermined value.

The above description is intended to be illustrative, and not restrictive. Other embodiments can be used, such as by one of ordinary skill in the art upon reviewing the above description. For example, elements of one described embodiment may be used in conjunction with elements from other described embodiments. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

The Abstract is provided to comply with 37 C.F.R. §1.72 (b), to allow the reader to quickly ascertain the nature of the technical disclosure. It is submitted with the understanding that it will not be used to interpret or limit the scope or meaning of the claims.

What is claimed, is:

1. A method of controlling the operating temperature of a fuel cell system, the method comprising:
   providing a fuel cell system that includes
      a planar fuel cell array,
      a heat transport structure in direct thermal communication with the planar fuel cell array,
      a heat dissipation device in direct thermal communication with the heat transport structure and indirect thermal communication with the planar fuel cell array,
      an insulation layer disposed between the heat dissipation device and the planar fuel cell array, and
      a heat removal device in indirect thermal communication with the planar fuel cell array and the heat transport structure and configured to remove heat from the heat dissipation device;
   contacting the planar fuel cell array with a fuel to produce heat and electricity until the planar fuel cell array reaches a desired operating temperature, wherein the heat removal device is not activated while the planar fuel cell array is below the desired operating temperature; and
   removing the heat from the heat dissipation device by activating the heat removal device if the planar fuel cell array exceeds the desired operating temperature.

2. The method of claim 1, wherein the flow of reactants and fuel cell reaction products are not altered by the operating of the heat transport structure, the heat dissipation device, or the heat removal device.

3. The method of claim 2, wherein the system is devoid of fans that modify the airflow over a cathode surface of the planar fuel cell array.

4. The method of claim 1, wherein the heat removal device includes a Peltier cooler.

5. The method of claim 1, wherein the heat transport structure contacts a lateral side of a cathode layer of the planar fuel cell array and a lateral side of an anode layer of the planar fuel cell array and wherein heat is conducted from the lateral side of the cathode layer and from the lateral side of the anode layer.

6. The method of claim 1, wherein the heat dissipation device is a heat sink.

7. The method of claim 1, wherein the heat removal device is a fan and the insulation layer thermally isolates the heat dissipation device from direct transfer of heat from the planar fuel cell array.

8. The method of claim 1, wherein the heat removal device is a solid state heat transfer device.

9. The method of claim 1, wherein the heat removal device is a cooling system that includes a heat transfer fluid that is not air.

10. The method of claim 9, wherein the insulation layer is disposed on major planes of both the heat dissipation device and the planar fuel cell array.

11. The method of claim 1, wherein the fuel cell system further includes a hydrogen distribution manifold disposed on an anode side of the planar fuel cell array and wherein the hydrogen distribution manifold and the heat dissipation device are both in contact with the insulation layer and disposed on opposite sides of the insulation layer.

12. The method of claim 1, wherein the insulation layer is less than 1 millimeter thick.

13. The method of claim 1, further including monitoring the operating temperature of the planar fuel cell array.

14. The method of claim 13, further including adjusting the rate at which the heat is removed from the heat dissipation device based upon the operating temperature of the planar fuel cell array.

15. The method of claim 1, wherein the fuel cell system is contained within a hand-held electronics device.

16. The method of claim 1, wherein the planar fuel cell array has a power to weight ratio of 2 Watts per gram or less.

17. The method of claim 1, wherein the insulation layer has a thermal conductivity of 10 W/mK or less.

18. A method of producing power, the method comprising:
   providing a fuel cell system that includes
      a planar fuel cell array,
      a heat transport structure in direct thermal communication with the planar fuel cell array,
      a heat dissipation device in direct thermal communication with the heat transport structure and indirect thermal communication with the planar fuel cell array, and
      a heat removal device in indirect thermal communication with the planar fuel cell array and the heat transport structure and configured to remove heat from the heat dissipation device, wherein the fuel cell system is at an initial temperature of 5° C. or less;
   contacting the planar fuel cell array with a fuel to produce heat and electricity until the planar fuel cell array reaches a desired operating temperature, wherein the desired operating temperature is greater than 45° C. and the heat removal device is not activated while the planar fuel cell array is below the desired operating temperature; and
   removing the heat from the heat dissipation device by activating the heat removal device if the planar fuel cell array exceeds the desired.

19. The method of claim 18, wherein the fuel cell system further includes an insulation layer disposed between the heat dissipation device and the planar fuel cell array, wherein the insulation layer is disposed on major planes of both the heat dissipation device and the planar fuel cell array and thermally isolates the heat dissipation device from direct transfer of heat from the planar fuel cell array and wherein the insulation layer is less than 1 millimeter thick and has a thermal conductivity of 10 W/mK or less.

20. The method of claim 18, wherein the heat transport structure contacts a lateral side of a cathode layer of the planar fuel cell array and a lateral side of an anode layer of the planar fuel cell array and wherein heat is conducted from the lateral side of the cathode layer and from the lateral side of the anode layer.

21. The method of claim 18, wherein the heat dissipation device and the heat transport structure have a combined thermal mass that is no more than 200% larger than a total thermal mass of the planar fuel cell array.

22. A method of controlling the operating temperature of a fuel cell system, the method comprising:
   providing a fuel cell system that includes
      a planar fuel cell array that includes a cathode layer and an anode layer,
      a heat transport structure in direct thermal communication with a lateral side of the cathode layer and a lateral side of the anode layer,
      a heat dissipation device in direct thermal communication with the heat transport structure and indirect thermal communication with the planar fuel cell array,
      a heat removal device in indirect thermal communication with the planar fuel cell array and the heat transport structure and configured to remove heat from the heat dissipation device, and
      an insulation layer disposed between the heat dissipation device and the planar fuel cell array, wherein the insulation layer is disposed on major planes of both the heat dissipation device and the planar fuel cell array and thermally isolates the heat dissipation device from direct transfer of heat from the planar fuel cell array and wherein the insulation layer is less than 1 millimeter thick and has a thermal conductivity of 10 W/mK or less;
   contacting the planar fuel cell array with a fuel to produce heat and electricity until the planar fuel cell array reaches a desired operating temperature, wherein the heat removal device is not activated while the planar fuel cell array is below the desired operating temperature; and
   removing the heat from the heat dissipation device by activating the heat removal device if the planar fuel cell array exceeds the desired operating temperature and wherein heat is conducted to the heat transport structure from the lateral side of the cathode layer and from the lateral side of the anode layer.

23. The method of claim 22, wherein the heat dissipation device and the heat transport structure have a combined thermal mass that is no more than 200% larger than a total thermal mass of the planar fuel cell array.

24. A method of controlling the operating temperature of a fuel cell system, the method comprising:
   providing a fuel cell system that includes
      a planar fuel cell array,
      a heat transport structure in direct thermal communication with the planar fuel cell array,
      a heat dissipation device in direct thermal communication with the heat transport structure and indirect thermal communication with the planar fuel cell array, wherein the heat dissipation device and the heat transport structure have a combined thermal mass that is no more than 200% larger than a total thermal mass of the planar fuel cell array, and
      a heat removal device in indirect thermal communication with the planar fuel cell array and the heat transport structure and configured to remove heat from the heat dissipation device;
   contacting the planar fuel cell array with a fuel to produce heat and electricity until the planar fuel cell array reaches a desired operating temperature, wherein the heat removal device is not activated while the planar fuel cell array is below the desired operating temperature; and
   removing the heat from the heat dissipation device by activating the heat removal device if the planar fuel cell array exceeds the desired operating temperature.

* * * * *